United States Patent
Calixte et al.

(10) Patent No.: US 11,892,711 B2
(45) Date of Patent: Feb. 6, 2024

(54) METHOD FOR DETERMINING A SINGLE VISION OPHTHALMIC LENS

(71) Applicant: Essilor International, Charenton-le-Pont (FR)

(72) Inventors: Laurent Calixte, Charenton-le-Pont (FR); Matthieu Guillot, Charenton-le-Pont (FR); Carlos Rego, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 598 days.

(21) Appl. No.: 17/043,223

(22) PCT Filed: Mar. 28, 2019

(86) PCT No.: PCT/EP2019/057951
§ 371 (c)(1),
(2) Date: Sep. 29, 2020

(87) PCT Pub. No.: WO2019/185848
PCT Pub. Date: Oct. 3, 2019

(65) Prior Publication Data
US 2021/0018763 A1 Jan. 21, 2021

(30) Foreign Application Priority Data
Mar. 30, 2018 (EP) ..................................... 18305383

(51) Int. Cl.
*G02C 7/02* (2006.01)
(52) U.S. Cl.
CPC ............. *G02C 7/027* (2013.01); *G02C 7/025* (2013.01); *G02C 7/028* (2013.01)
(58) Field of Classification Search
CPC ......... G02C 7/027; G02C 7/028; G02C 7/025
(Continued)

(56) References Cited

U.S. PATENT DOCUMENTS 3,969,020 A * 7/1976 Lynn ..................... A61B 3/02
351/222
6,382,789 B1 5/2002 Baudart et al.
(Continued)

FOREIGN PATENT DOCUMENTS

CN 103424890 A 12/2013
CN 106716231 A 5/2017
(Continued)

OTHER PUBLICATIONS

Combined Chinese Office Action and Search Report dated Oct. 11, 2021 in Patent Application No. 201980023432.5 (with English language translation), 19 pages.
(Continued)

*Primary Examiner* — James R Greece
(74) *Attorney, Agent, or Firm* — Oblon, McClelland, Maier & Neustadt, L.L.P.

(57) ABSTRACT

A method implemented by a computer for determining a single vision ophthalmic lens that is adapted to a wearer, the method including a wearer prescription data providing step during which wearer prescription data indicative at least of the prescribed optical power of the wearer are provided, a wearing data providing step during which wearing data indicative of the wearing parameters of the single vision ophthalmic lens by the wearer are provided, a single vision ophthalmic lens determining step during which the single vision ophthalmic lens is determined so that in wearing conditions corresponding to the wearing parameters, the single vision ophthalmic lens provides to the wearer the prescribed optical power in at least a first gazing direction when gazing at a first distance and second gazing direction when gazing at a second distance, wherein the first and second distances are different and the first and second gazing directions are different.

14 Claims, 6 Drawing Sheets

(58) Field of Classification Search
USPC .................................................. 351/159.74
See application file for complete search history.

(56) References Cited

U.S. PATENT DOCUMENTS

| | | | |
|---|---|---|---|
| 2003/0174278 A1 | 9/2003 | Esser et al. | |
| 2010/0002191 A1 | 1/2010 | Drobe | |
| 2010/0060852 A1 | 3/2010 | Merritt et al. | |
| 2011/0128496 A1* | 6/2011 | Giraudet | G02C 7/027 351/204 |
| 2011/0202286 A1 | 8/2011 | De Rossi et al. | |
| 2012/0176583 A1 | 7/2012 | Calixte et al. | |
| 2012/0274893 A1 | 11/2012 | Wada et al. | |
| 2013/0170017 A1* | 7/2013 | Caldeira | G02B 25/001 359/319 |
| 2017/0031179 A1 | 2/2017 | Guillot et al. | |
| 2017/0299890 A1 | 10/2017 | Hernandez-Castaneda et al. | |
| 2017/0351114 A1* | 12/2017 | Calixte | G02C 7/024 |
| 2018/0081199 A1 | 3/2018 | Jarrousse et al. | |

FOREIGN PATENT DOCUMENTS

| | | | |
|---|---|---|---|
| CN | 107529340 A | 12/2017 | |
| EP | 0 990 939 A1 | 4/2000 | |
| EP | 2 177 943 A1 | 4/2010 | |
| EP | 3037869 A1 * | 6/2016 | ............ G02C 7/024 |
| FR | 2 912 820 A1 | 8/2008 | |
| FR | 2950983 A1 * | 4/2011 | ............ G02C 7/025 |
| JP | 2008-89618 A | 4/2008 | |
| JP | 2008-249828 A | 10/2008 | |
| JP | 2010-513985 A | 4/2010 | |
| JP | 2012-233959 A | 11/2012 | |
| WO | WO 2015/150030 A1 | 10/2015 | |

OTHER PUBLICATIONS

English translation of Notice of Reasons for Rejection dated Dec. 6, 2021 in Japanese Patent Application No. 2020-552856, 8 pages.
International Search Report and Written Opinion dated Jun. 21, 2019 in PCT/EP2019/057951 filed on Mar. 28, 2019.

* cited by examiner

METHOD FOR DETERMINING A SINGLE VISION OPHTHALMIC LENS

TECHNICAL FIELD

The invention relates to a method implemented by computer means for determining a single vision ophthalmic lens adapted to a wearer, to a computer program product and to a single vision ophthalmic lens adapted to a wearer.

BACKGROUND OF THE INVENTION

Single vision ophthalmic lenses are typically calculated to compensate visual defects of a non presbyope ametrope wearer, considering the far vision prescription and looking at objects at far distance, also referred to as infinite distance. But during daily use of single vision ophthalmic lenses, the wearers looks of course also at objects that are at intermediate or near distances, for example less than 1 meter away.

Ray tracing from objects at near or far distances being different, optical aberrations through the single vision ophthalmic lens are also different. A single vision ophthalmic optimized for far vision has low optical aberration level when looking at objects at far distance but the level of optical aberration becomes more important when looking at objects at near or intermediate distance, and this can cause discomfort or visual fatigue for the wearer.

Therefore, it appears that there is a need for a single vision ophthalmic lens that would provide a low level of aberration not only when looking at far distances but also when looking at near and/or intermediate distances.

A goal of the invention is to provide an improved single vision ophthalmic lens that does not have such drawbacks and a method for determining such single vision ophthalmic lens.

SUMMARY OF THE INVENTION

To this end, the invention proposes a method implemented by computer means for determining a single vision ophthalmic lens, the single vision ophthalmic lens being adapted to a wearer, the method comprises:
 a wearer prescription data providing step during which wearer prescription data indicative at least of the prescribed optical power of the wearer are provided,
 a wearing data providing step during which wearing data indicative of the wearing parameters of the single vision ophthalmic lens by the wearer are provided,
 a single vision ophthalmic lens determining step during which the single vision ophthalmic lens is determined so that in wearing conditions corresponding to the wearing parameters, the single vision ophthalmic lens provides to the wearer the prescribed optical power in at least a first gazing direction when gazing at a first distance and a second gazing direction when gazing at a second distance,
wherein the first and second distances are different and the first and second gazing directions are different.

Advantageously, the single vision ophthalmic lens determined by the method of the invention provides the prescribed optical power in at least to gazing direction when gazing different distances. The wearer of the single vision ophthalmic lens obtained by the method of the invention has the prescribed optical power when gazing at a first distance, for example far distance, in a first gazing direction and when gazing at a second distance, for example near distance, in a second gazing direction.

Therefore, the single vision ophthalmic lens according to the invention reduces the discomfort or visual fatigue of the wearer in everyday life.

According to further embodiments which can be considered alone or in combination:
 the wearer prescription data is further indicative of the prescribed astigmatism, value and axis, of the wearer and during the single vision ophthalmic lens determining step the single vision ophthalmic lens is determined so that in wearing conditions corresponding to the wearing parameters, the single vision ophthalmic lens provides to the wearer the prescribed astigmatism in at least the first gazing direction when gazing at the first distance and the second gazing direction when gazing at the second distance; and/or
 the angle between the first and the second gazing directions is greater than or equal to 5 deg, for example greater than or equal to 10 deg, for example greater than or equal to 15 deg, for example greater than or equal to 20 deg; and/or
 the difference between the first and second distance is greater than or equal to 0.3 m, for example greater than or equal to 1.0 meter, for example greater than or equal to 4.0 meters; and/or
 the wearer data are indicative of standard wearing parameters; and/or
 the method further comprises prior to the single vision ophthalmic lens determining step an optical surface data providing step during which optical surface data indicative of a finished surface of the single vision ophthalmic lens is provided and during the single vision ophthalmic lens determining the position and/or the shape of the surface opposite to the finished surface are/is determined; and/or
 the finished surface is the front surface of the single vision ophthalmic lens; and/or
 the first distance corresponds to a far vision distance, for example greater than or equal to 5 meters; and/or
 the first gazing direction has an angle $\alpha$ greater than or equal to $-16$ deg and smaller than or equal to 8 deg and an angle $\beta$ greater than or equal to $-5.0$ deg and smaller than or equal to 5.0 deg; and/or
 the second distance corresponds to a near vision distance, for example smaller than or equal to 4.0 meters, for example smaller than or equal to 1.0 meter, for example smaller than or equal to 0.4 meter; and/or
 the second gazing direction has an angle $\alpha$ greater than or equal to 5 deg and smaller than or equal to 36 deg and an angle $\beta$ greater than or equal to $-4$ deg and smaller than or equal to 16 deg.

The invention further relates to a computer program product comprising one or more stored sequences of instructions that are accessible to a processor and which, when executed by the processor, causes the processor to carry out the steps, at least the single vision ophthalmic lens determining step, of the method of the invention.

The invention also concerns a single vision ophthalmic lens adapted to a wearer having at least a prescribed optical power, wherein the single vision ophthalmic lens provides to the wearer in standard wearing condition in at least a first gazing direction the prescribed optical power when gazing at a first distance and in at least a second gazing direction the prescribed optical power when gazing at a second distance, the first and second distance being different and the first and second gazing direction being different.

According to further embodiments which can be considered alone or in combination:

the wearer has a prescribed astigmatism (astigmatism value and astigmatism axis) and the single vision ophthalmic lens provides to the wearer in standard wearing conditions in at least the first gazing direction the prescribed astigmatism when gazing at the first distance and in at least the second gazing direction the prescribed astigmatism when gazing at the second distance; and/or the norm of the vector corresponding to the difference of the prescribed astigmatism and the astigmatism in the first and second gazing direction is smaller than or equal to 0.05 D; and/or the single vision ophthalmic lens is configured so that for any gazing direction comprised in an elliptical cone of half major axis at 8 deg and half minor axis at 4 deg, the orientation of the major axis being horizontal in standard wearing conditions, the elliptical cone being centered at the second gazing direction, the average norm of the vector corresponding to the difference of the measured astigmatism at said any gazing direction and the prescribed astigmatism is smaller than or equal to 0.05 D; and/or the angle between the first and the second gazing directions is greater than or equal to 5 deg, for example greater than or equal to 10 deg, for example greater than or equal to 15 deg, for example greater than or equal to 20 deg; and/or the difference between the first and second distance is greater than or equal to 30 cm, for example greater than or equal to 1 meter, for example greater than or equal to 4 meters; and/or the first distance corresponds to a far vision distance, for example greater than or equal to 5 meters; and/or the first gazing direction has an angle α greater than or equal to −16 deg and smaller than or equal to 8 deg and an angle β greater than or equal to −5.0 deg and smaller than or equal to 5.0 deg; and/or the second gazing distance corresponds to a near vision distance, for example smaller than or equal to 4.0 meters, for example smaller than or equal to 1.0 meter, for example smaller than or equal to 0.4 meter; and/or the second gazing direction has an angle α greater than or equal to 5 deg and smaller than or equal to 36 deg and an angle β greater than or equal to −4 deg and smaller than or equal to 16 deg

BRIEF DESCRIPTION OF THE DRAWINGS

Non-limiting embodiments of the invention will now be described with reference to the accompanying drawing wherein.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

DETAILED DESCRIPTION OF EMBODIMENTS OF THE INVENTION

The invention relates to a single vision ophthalmic lens intended to be worn in front of an eye of a person.

In the reminder of the description, terms like «up», «bottom», «horizontal», «vertical», «above», «below», «front», «rear» or other words indicating relative position may be used. These terms are to be understood in the wearing conditions of the single vision ophthalmic lens.

Although the invention is not directed to progressive lenses, the wording used in this description is illustrated in FIGS. 1 to 10 of document WO2016/146590 for a progressive lens. The skilled person can adapt the definitions for single vision lenses.

Figure 2:
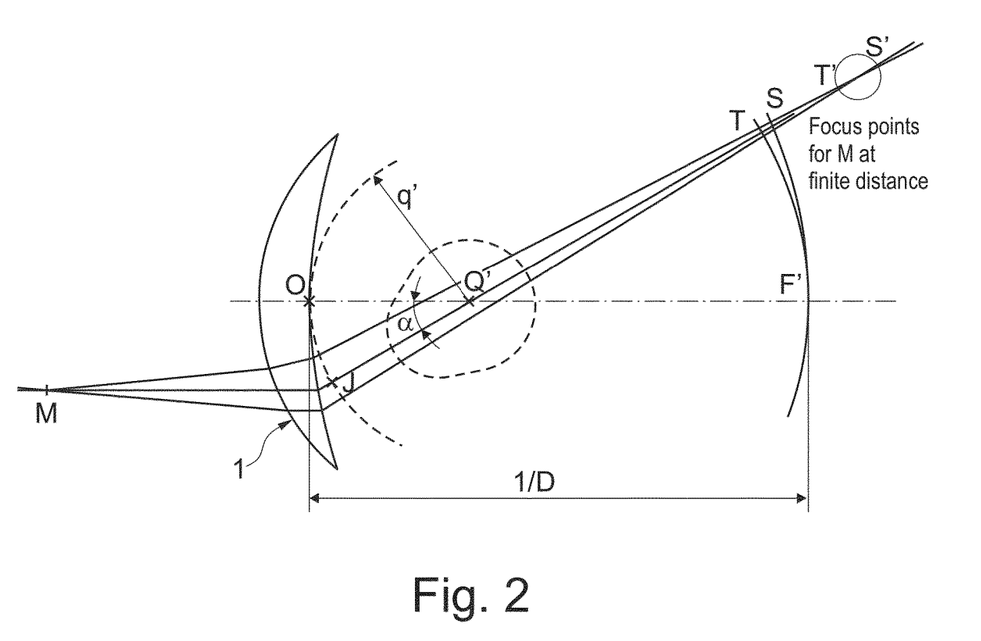
Figure 11:
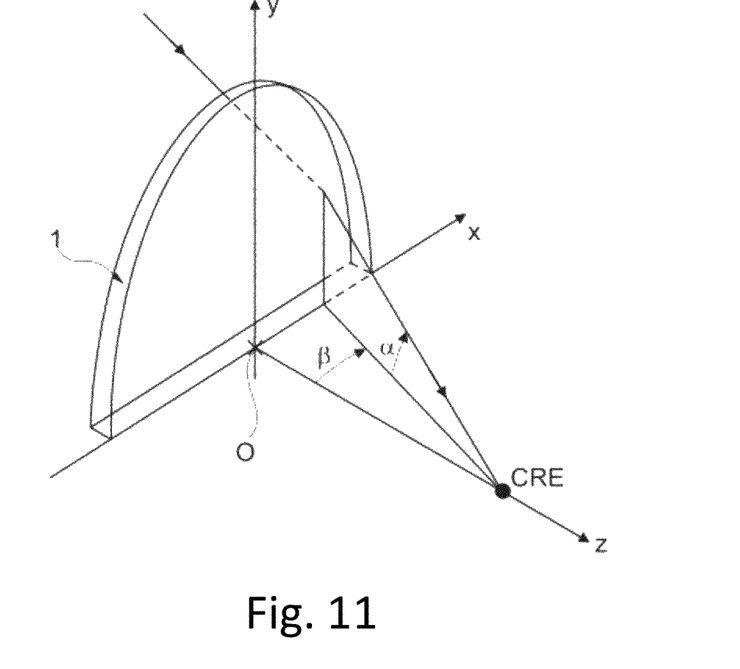

In the sense of the invention a "gaze direction" is identified by a couple of angle values (α,β), wherein said angles values are measured with regard to reference axes centered on the center of rotation of the eye, commonly named as "CRE". More precisely, FIG. 11 represents a perspective view of such a system illustrating parameters α and β used to define a gaze direction. FIG. 2 is a view in the vertical plane parallel to the antero-posterior axis of the wearer's head and passing through the center of rotation of the eye in the case when the parameter β is equal to 0. The center of rotation of the eye is labeled CRE. The axis CRE-F', shown on FIG. 2 in a dot-dash line, is the horizontal axis passing through the center of rotation of the eye and extending in front of the wearer—that is the axis CRE-F' corresponding to the primary gaze direction. The lens is placed and centered in front of the eye such that the axis CRE-F' cuts the front surface of the lens on a point called the fitting cross, which is, in general, present on lenses to enable the positioning of lenses in a frame by an optician. The point of intersection of the rear surface of the lens and the axis CRE-F' is the point, O. A vertex sphere, which center is the center of rotation of the eye, CRE, and has a radius q'=O-CRE, intercepts the rear surface of the lens in a point of the horizontal axis. A value of radius q' of 25.5 mm corresponds to a usual value and provides satisfying results when wearing the lenses. Other value of radius q' may be chosen. A given gaze direction, represented by a solid line on FIG. 11, corresponds to a position of the eye in rotation around CRE and to a point J (see FIG. 2) of the vertex sphere; the angle β is the angle formed between the axis CRE-F' and the projection of the straight line CRE-J on the horizontal plane comprising the axis CRE-F'; this angle appears on the scheme on FIG. 11. The angle α is the angle formed between the axis CRE-J and the projection of the straight line CRE-J on the horizontal plane comprising the axis CRE-F'; this angle appears on the scheme on FIGS. 11 and 2. A given gaze view thus corresponds to a point J of the vertex sphere or to a couple (α,β). The more the value of the lowering gaze angle is positive, the more the gaze is lowering and the more the value is negative, the more the gaze is rising. In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

A usual single vision ophthalmic lens is calculated to provide a unique optical compensation corresponding to prescribed sphere, cylinder and axis made at a determined object distance, usually far distance, for example greater than 5 meters.

For an object positioned at the distance for which the prescription has been determined, the corresponding single vision ophthalmic lens provides to the wearer mean power, astigmatism and axis corresponding to the prescribed sphere, cylinder and axis. However, for an object positioned at a distance different from the one for which the prescription has been determined the mean power, astigmatism and axis through the lens may vary from the prescription.

Figure 1:
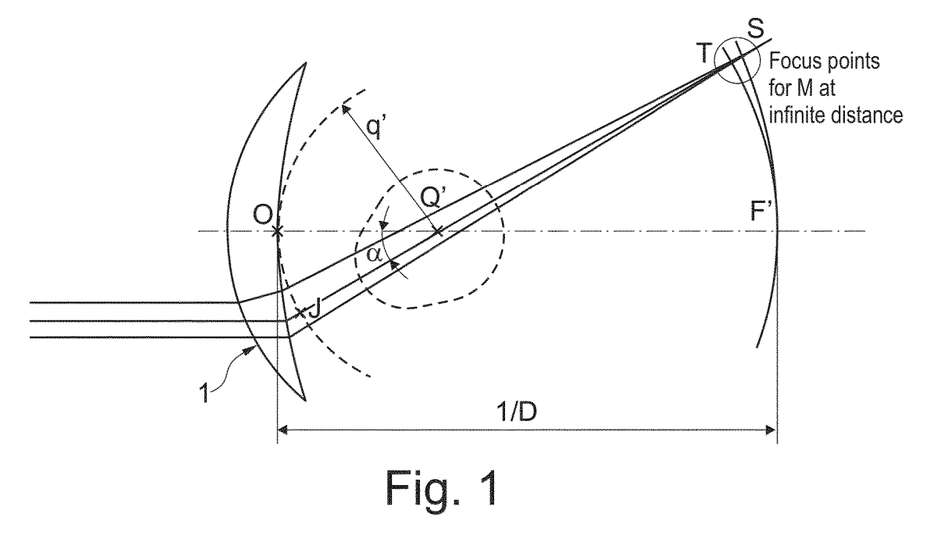
FIGS. 1,2 and 11 illustrate ray tracing methods used for determining ophthalmic lenses.

FIG. 1 illustrates the case of a perfect single vision ophthalmic lens calculated with a prescription determined for far vision. The light rays coming from infinite focus on a sphere called far point sphere. As explained in WO2016/146590 the mean power (or wearer power) through the lens for this gaze direction is:

$$P=1/\text{infinite}+1/2*(1/JS+1/JT)=1/2*(1/JS+1/JT)$$

As illustrated on FIG. 2, for the same single vision ophthalmic lens as on FIG. 1, considering an object M at a near distance, for example 40 cm, of the lens in the same gaze direction as in FIG. 1, at a finite distance, the light rays coming from the object M passing through the single vision ophthalmic lens focus farther behind the single vision ophthalmic lens than when the object M is at far distance, for example infinite.

The mean power through the single vision ophthalmic lens for an object M at near vision distance is:

$$P'=1/MJ+1/2*(1/JS'+1/JT').$$

With any ophthalmic lens, the optical system can rarely be considered as a centered optical system and Gauss approximation never apply. Therefore, the single vision ophthalmic lens cannot be considered as stigmatic and usual considerations as principal planes cannot be taken into account.

In such conditions, only ray tracing through the ophthalmic lens is able to determine where the light rays passing through the ophthalmic lens focus, and the power $P'$ for M at finite distance is different from P obtained for object at infinite whereas in Gauss approximation $P'$ would be equal to P.

Therefore, if a single vision ophthalmic lens is calculated to have mean power, astigmatism and axis in every gaze directions corresponding to the prescription values for objects proximity equal to proximity of the prescription determination, when the wearer gazes at objects at different distances the mean power, astigmatism and axis through the single vision ophthalmic lens vary from the prescription values and optical default of the single vision ophthalmic lens increase, causing blur vision and then discomfort or fatigue to the wearer.

The present invention proposes a method, for example implemented by computer means, for determining a single vision ophthalmic lens adapted to a wearer.

Figure 3:
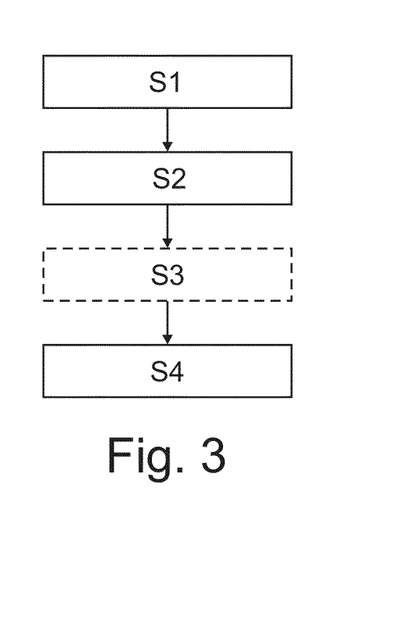
FIG. 3 is a flowchart of different steps of a method according to the invention.

As illustrated on FIG. 3, the method comprises at least:
a wearer prescription data providing step S1,
a wearing data providing step S2, and
a single vision ophthalmic lens determining step S4,
wherein the first and second distances are different and the first and second gazing directions are different.

During the wearer prescription data providing step S1, wearer prescription data indicative of at least the prescribed optical power of the wearer are provided.

The prescribed optical power is provided for a given gazing distance, preferably a far gazing distance, for example greater than or equal to 5 meters.

According to an embodiment of the invention, the wearer prescription data may further be indicative of the prescribed astigmatism of the wearer. When the wearer prescription data is further indicative of the prescribed astigmatism of the wearer, such prescribed astigmatism is provided for the same gazing distance as the prescribed optical power, preferably a far gazing distance, for example greater than or equal to 5 meters.

During the wearing data providing step S2, wearing data indicative of the wearing parameters of the single vision ophthalmic lens by the wearer are provided.

The wearing conditions are to be understood as the position of the ophthalmic lens with relation to the eye of a wearer, for example defined by a pantoscopic angle, a Cornea to lens distance, a Pupil-cornea distance, a centre of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to −8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearer condition may be defined by a pantoscopic angle of −8°, a Cornea to lens distance of 12 mm, a Pupil-cornea distance of 2 mm, a CRE to pupil distance of 11.5 mm, a CRE to lens distance of 25.5 mm and a wrap angle of 0°.

During the single vision ophthalmic lens determining step S4 the single vision ophthalmic lens is determined so that in wearing conditions corresponding to the wearing parameters, the single vision ophthalmic lens provides to the wearer the prescribed optical power in at least a first gazing direction when gazing at a first distance and a second gazing direction when gazing at a second distance. The first and second distances are different and the first and second gazing directions are different.

For example, the difference between the optical power provided to the wearer in the first direction when gazing at a first distance and the optical power provided in the second gazing direction when gazing at a second distance is smaller than or equal to 0.1 Diopters, for example substantially equal to 0 Diopter.

According to an embodiment, the prescription data may further comprise data indicative of the prescribed astigmatism of the wearer and during the single vision ophthalmic lens determining step the single vision ophthalmic lens is determined so that in wearing conditions corresponding to the wearing parameters, the single vision ophthalmic lens provides to the wearer the prescribed astigmatism in at least the first gazing direction when gazing at the first distance and the second gazing direction when gazing at the second distance.

For example, the norm of the vector corresponding to the difference between the astigmatism provided to the wearer in the first direction when gazing at a first distance and the prescribed astigmatism is smaller than or equal to 0.1 Diopters, for example smaller than or equal to 0.05 Diopters.

In particular if the first gazing direction and distance corresponds to far vision gazing direction and distance, the norm of the vector corresponding to the difference between the astigmatism provided to the wearer is substantially equal to 0.0 D.

For example, the norm of the vector corresponding to the difference between the astigmatism provided in the second gazing direction when gazing at a second distance and the prescribed astigmatism is smaller than or equal to 0.1 Diopters, for example smaller than or equal to 0.05 Diopters.

The method of the invention is not limited to two gazing directions and may be implemented for a set of gazing directions, for example for all gazing directions.

During the single vision ophthalmic lens determining step S3, a set of gaze directions is associated to an object proximity which can be different for each gazing direction. For example, the fact that the closer the objects are the more the gaze lowering increase can be use to describe the environment object. The convergence of the eyes when looking at close objects can be also taken into account in the single vision ophthalmic lens determination.

During the refraction determination the eye care practitioner determines the needed power of the lens taking in account rays coming from infinite distance or at least distances greater than or equal to 5 meters. The optical power is defined with the far point of accommodation as $P'=1/fv$ with fv the back-vertex distance, i.e. distance from the back surface of the lens to point F'.

As illustrated on FIGS. 1 and 2, when the gaze direction changes the optical power has to be set in order to keep ray path focalized at the far point sphere.

A single vision ophthalmic lens determined by a method of the invention provides to the wearer the right power to the wearer looking at objects at at least two different distances.

Distance objects are usually seen through the upper part of the lens. Near objects are usually seen through the lower part of the lens.

Therefore, depending on the activity, it can be set an object location depending on the gaze direction. This location is express in a proximity scale. If distance object is D in meter then the proximity is given by px=1/D, px expressed in $m^{-1}$.

Figure 4:
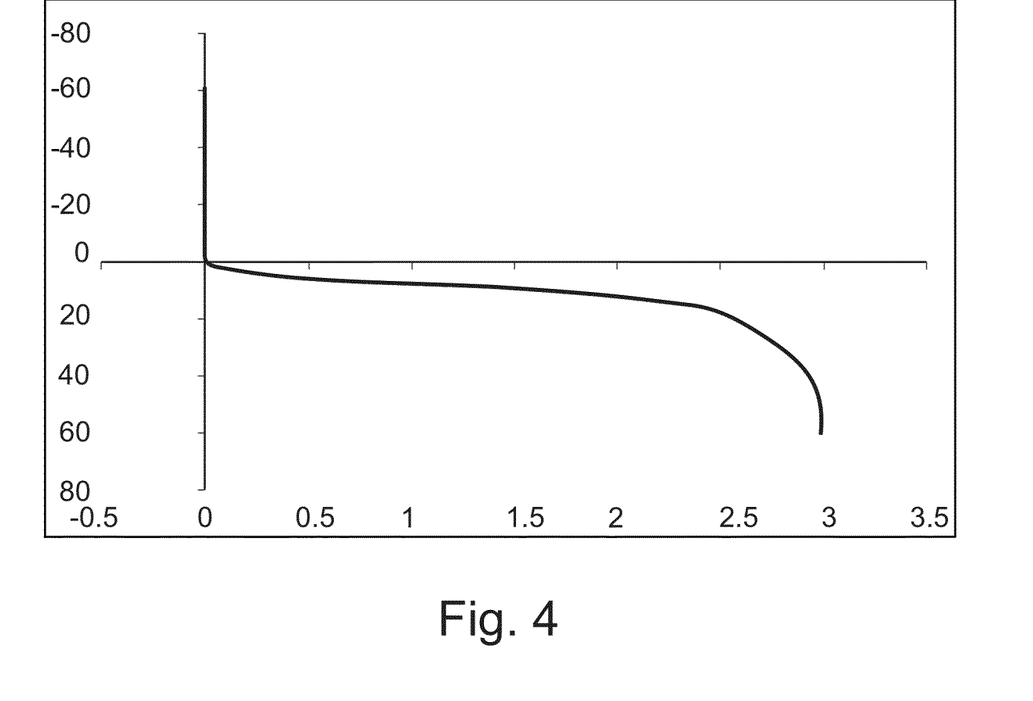
FIGS. 4 and 12 represent proximity graphs.

FIG. 4 is an example of a proximity graph that may be used in the method of the invention.

X axis gives the proximity values in ($m^{-1}$)

Y axis gives the vertical angle in degrees for gaze direction in a directions relative to TABO referential.

The angle between the first and the second gazing directions is greater than or equal to 5 deg, for example greater than or equal to 10 deg, for example greater than or equal to 15 deg, for example greater than or equal to 20 deg.

The difference between the first and second distance is greater than or equal to 30 cm, for example greater than or equal to 1 meter, for example greater than or equal to 4 meters.

According to an embodiment of the invention, the first distance corresponds to a far vision distance, for example greater than or equal to 5 meters. In the field of ophthalmic far distance or infinity corresponds to distance greater than or equal to 5 meters, for example greater than 5 meters.

The first gazing direction may have an angle α greater than or equal to −16.0 deg and smaller than or equal to 8.0 deg and an angle β greater than or equal to −5.0 deg and smaller than or equal to 5.0 deg.

Such first gazing direction advantageously combines with a first distance corresponding to far vision distance. Indeed, such gazing direction corresponds to the natural gazing direction when gazing at far distance.

According to an embodiment of the invention, the second distance corresponds to a near vision distance, for example smaller than or equal to 4 meters, for example smaller than or equal to 1 meter, for example smaller than or equal to 40 cm.

The second gazing direction may have an angle α greater than or equal to 5.0 deg and smaller than or equal to 36 deg and an angle β greater than or equal to −4.0 deg and smaller than or equal to 16.0 deg.

Such second gazing direction advantageously combines with a second distance corresponding to near vision distance. Indeed, such gazing direction corresponds to the natural gazing direction when gazing at near distance.

A single vision ophthalmic lenses configured so that the angle between the first and the second gazing directions is around 5 deg, with a first distance greater than 5 meters and second distance around 63 cm is particularly adapted for working on a computer screen.

A single vision ophthalmic lenses configured so that the angle between the first and the second gazing directions is around 18 deg, with a first distance greater than 5 meters and a second distance around 40 cm is particularly adapted for reading or working on paper.

A single vision ophthalmic lenses configured so that the angle between the first and the second gazing directions is around 20 deg, with a first distance greater than 5 meters and a second distance around 40 cm is particularly adapted for reading or working on a digital tablet.

A single vision ophthalmic lenses configured so that the angle between the first and the second gazing directions is around 25 deg, with a first distance greater than 5 meters and a second distance lower than 40 cm is particularly adapted for using a smart phone.

Figure 12:
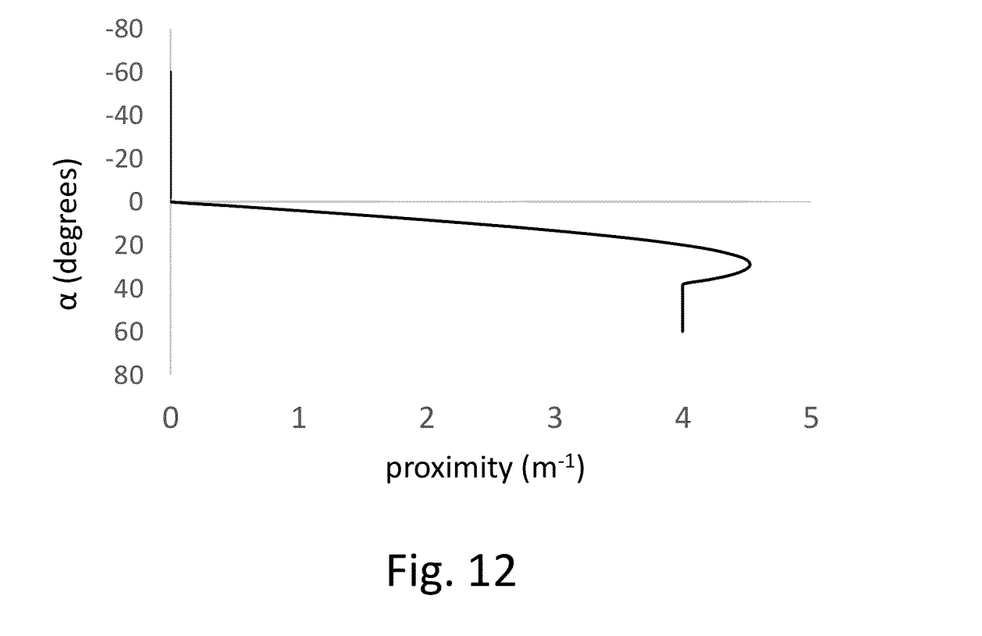

FIG. 12 is an example of a proximity graph that may be used in the method of the invention.

In an embodiment of the invention, the single vision ophthalmic lens comprises a first zone of stabilized optical power, so that when the wearer looks in the first gazing direction in wearing conditions corresponding to the wearing parameters, the outside world is seen by the wearer through the first zone of stabilized optical power, and the prescribed optical power is provided in the first gazing direction at the first gazing distance.

In an embodiment of the invention, the single vision ophthalmic lens comprises a second zone of stabilized optical power, so that when the wearer looks in the second gazing direction in wearing conditions corresponding to the wearing parameters, the outside world is seen by the wearer through the second zone of stabilized optical power, and the prescribed optical power is provided in the second gazing direction at the second gazing distance.

A single vision ophthalmic lens may be determined to comprise a first zone of stabilized optical power and a second zone of stabilized optical power so that the angle between the first gazing direction and the second gazing direction is greater than, or equal to, 40 degrees, with a first distance greater than 5 meters and a second distance lower than 25 cm.

Such single vision ophthalmic lens is particularly adapted for a child wearer.

In an embodiment of the invention which may be combined with any other embodiment, in wearing conditions corresponding to the wearing parameters, the single vision ophthalmic lens may provide the prescribed optical power at a third distance in a third gazing direction, wherein:
- the third distance is smaller than the first distance,
- the third distance is smaller than the second distance,
- the angle between the first gazing direction and the third gazing direction is smaller than the angle between the first gazing direction and the second gazing direction, and
- the angle between the second gazing direction and third gazing direction is smaller than the angle between the first gazing direction and the second gazing direction.

As illustrated on FIG. 3, the method of the invention may further comprise prior to the single vision ophthalmic lens determining step S4, an optical surface data providing step S3.

During the optical surface data providing step S3, optical surface data indicative of a finished surface of the single vision ophthalmic lens are provided.

The finished surface is preferably the front surface, or object surface, of the single vision ophthalmic lens. However, the invention is not limited to such embodiment and the skilled person may adapt the invention having the finished surface be the back or rear surface of the single vision ophthalmic lens.

According to such embodiment, during the single vision ophthalmic lens determining step S4, the position and/or the shape of the surface opposite to the finished surface are/is determined.

The invention also relates to a single vision ophthalmic lens adapted to a wearer having at least a prescribed optical power.

The single vision ophthalmic lens of the invention provides to the wearer in standard wearing condition in at least a first gazing direction the prescribed optical power when gazing at a first distance and in at least a second gazing direction the prescribed optical power when gazing at a second distance, the first and second distance being different and the first and second gazing direction being different.

Preferably, the single vision ophthalmic lens of the invention is determined by the method of the invention.

According to an embodiment, the wearer may have a prescribed astigmatism and the single vision ophthalmic lens provides to the wearer in standard wearing conditions in at least the first gazing direction the prescribed astigmatism when gazing at the first distance and in at least the second gazing direction the prescribed astigmatism when gazing at the second distance.

The angle between the first and the second gazing directions is preferably greater than or equal to 5 deg, for example greater than or equal to 10 deg, for example greater than or equal to 15 deg, for example greater than or equal to 20 deg.

The difference between the first and second distance may be greater than or equal to 30 cm, for example greater than or equal to 1 meter, for example greater than or equal to 4 meters.

According to an embodiment of the invention, the first distance corresponds to a far vision distance, for example greater than or equal to 5 meters.

Preferably, the first gazing direction has an angle α greater than or equal to −16 deg, for example greater than or equal to −8 deg, and smaller than or equal to 8 deg, for example smaller than 0 deg, and an angle β greater than or equal to −5.0 deg, for example greater than or equal to −2.0 degand smaller than or equal to 5.0 deg, for example smaller than or equal to 2.0 deg.

According to an embodiment of the invention, the second gazing distance corresponds to a near vision distance, for example smaller than or equal to 4.0 meters, for example smaller than or equal to 1.0 meter, for example smaller than or equal to 0.4 meter.

Preferably, the second gazing direction has an angle α greater than or equal to 5.0 deg, for example greater than or equal to 8.0 deg, for example greater than or equal to 16.0 deg and smaller than or equal to 36.0 deg, for example smaller than or equal to 32.deg, for example smaller than or equal to 28.0 deg and an angle β greater than or equal to −4.0 deg, for example greater than or equal to 0.0 deg and smaller than or equal to 16.0 deg.

Figure 5:
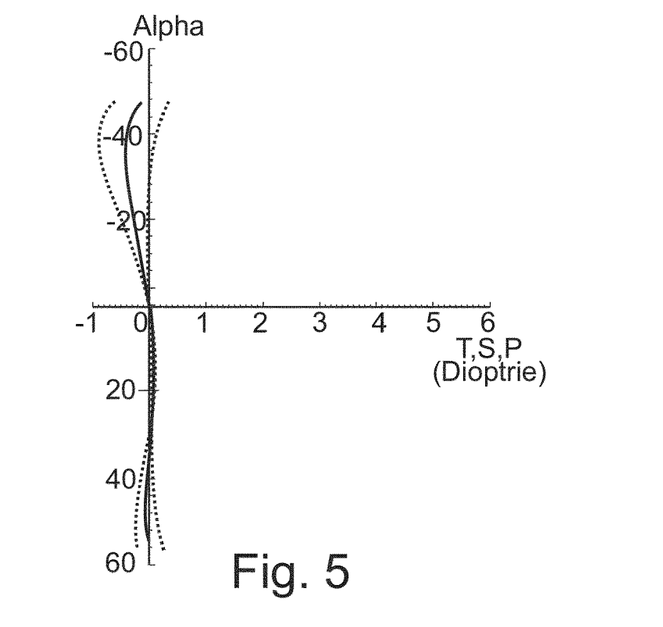
FIGS. 5 to 7 illustrate a prior art single vision ophthalmic lens.
Figure 6:
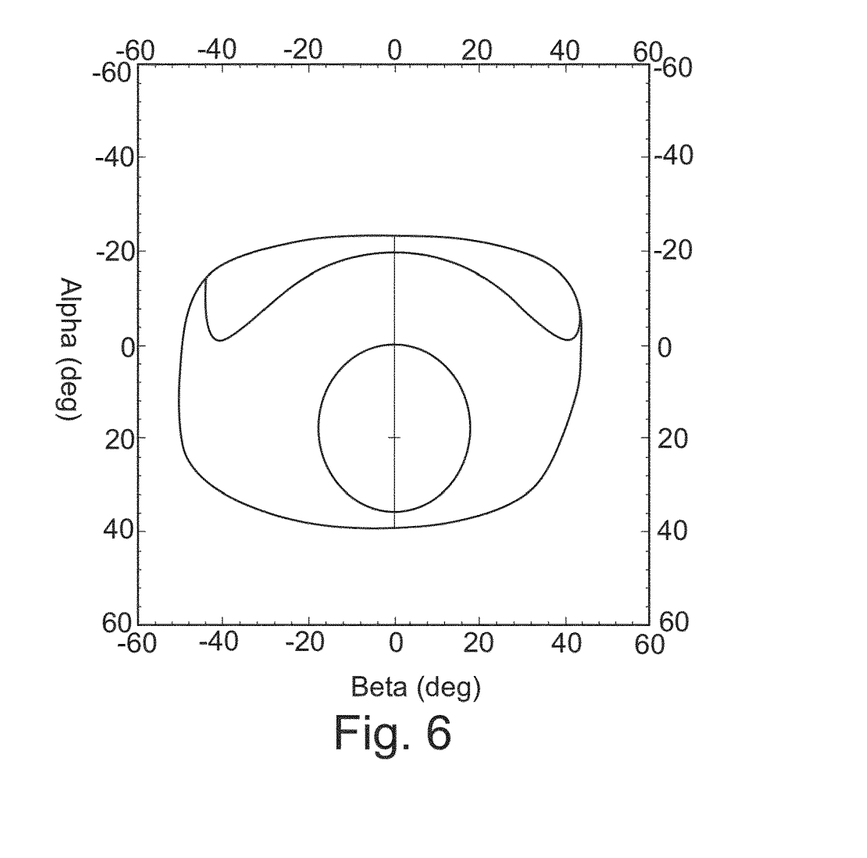
Figure 7:
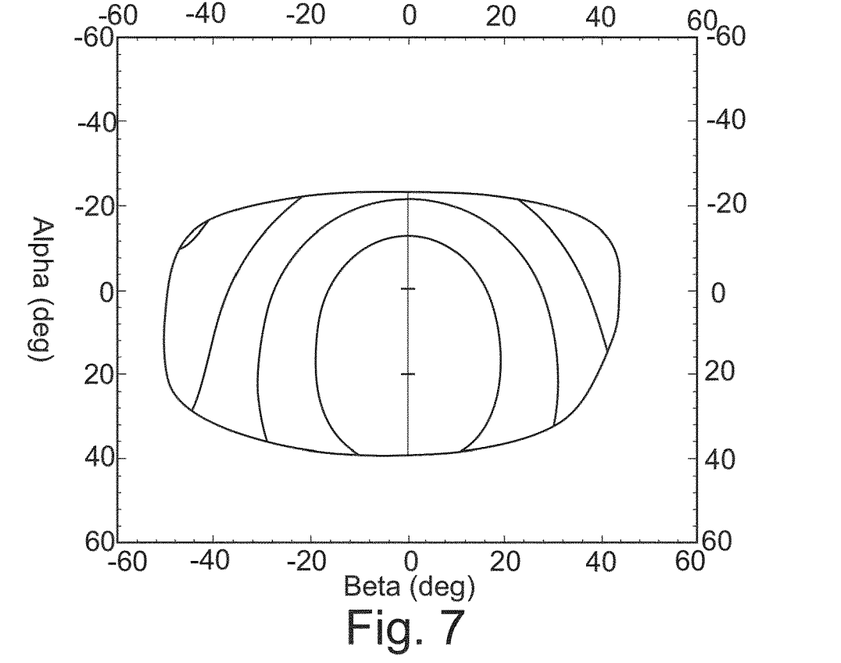

FIGS. 5 to 7 illustrate single vision ophthalmic lens determined using a prior art method.

The single vision ophthalmic lens illustrated on FIGS. 5 to 7 is determined for a wearer having a prescribed optical power of −4 diopters and a prescribed astigmatism of 0 diopters.

The reference point on the single vision ophthalmic lens are:
- the fitting cross (α=0 deg., β=0 deg.) is located on the front surface of the single vision ophthalmic lens to align with the wearer eye;
- center point (α=0 deg., β=0 deg.) points where the prescription is to be found; and
- a low point corresponding approximately to a lowering gaze direction a equal to −20 deg. and a calculated inset value for a 0.4 m object distance.

The wearing parameters are a pantoscopic angle of −8°, a wrap angle of 0° and an eye to lens distance of 12 mm.

When determining the single vision ophthalmic lens the objects are located at infinity, for each gaze direction objects proximity is then 0 m$^{-1}$.

FIG. 5 illustrates the wearer mean power in diopters and resulting astigmatism in diopters along meridian line expressed in deg.

The meridian line is defined as 3 segments:
- from the top of the lens to the center point or first reference point, the first segment is vertical above the first reference point;
- a segment that link first and second reference point or center point and low point in this example; and
- a vertical segment under the low point.

FIG. 6 represents the wearer mean power in diopters according to α, β gaze directions in deg.

FIG. 7 represents the resulting astigmatism in diopters according to α, β gaze directions in deg.

Table 1 represents the optical values at reference point when considering far distance objects.

TABLE 1

| Name | β (deg) | α (deg) | Mean Power (D) | Astigmatism (D) |
|---|---|---|---|---|
| Center point | 0.0 | 0.0 | −4.00 | 0.00 |
| Low point | 0.0 | −20.0 | −3.93 | 0.06 |
| FC | 0.0 | 0.0 | −4.00 | 0.00 |

Wearer mean power at center point is −4.00 D. This value is suitable for a wearer looking at distance object.

At low point wearer mean power is −3.93 D and there is 0.06 D of resulting astigmatism. Low point is an off axis point, therefore it shows some power errors and unwanted aberrations.

However according to the invention this traditional lens doesn't provide the right mean power to the wearer, when he is looking at near distance objects. Near distance objects can be take in account given their proximity.

It is then possible to evaluate the traditional single vision ophthalmic lens taking into account objects proximity. Table 2 provides optical values for the same traditional single vision ophthalmic lens when looking at near objects.

TABLE 2

| Name | β (deg) | α (deg) | Mean Power (D) | Astigmatism (D) |
|---|---|---|---|---|
| Center point | 0.0 | 0.0 | −4.00 | 0.00 |
| Low point | 0.0 | −20.0 | −3.93 | 0.11 |
| FC | 0.0 | 0.0 | −4.00 | 0.00 |

In this example mean power remains almost unchanged, but resulting astigmatism increase to 0.11 D.

Figure 8:
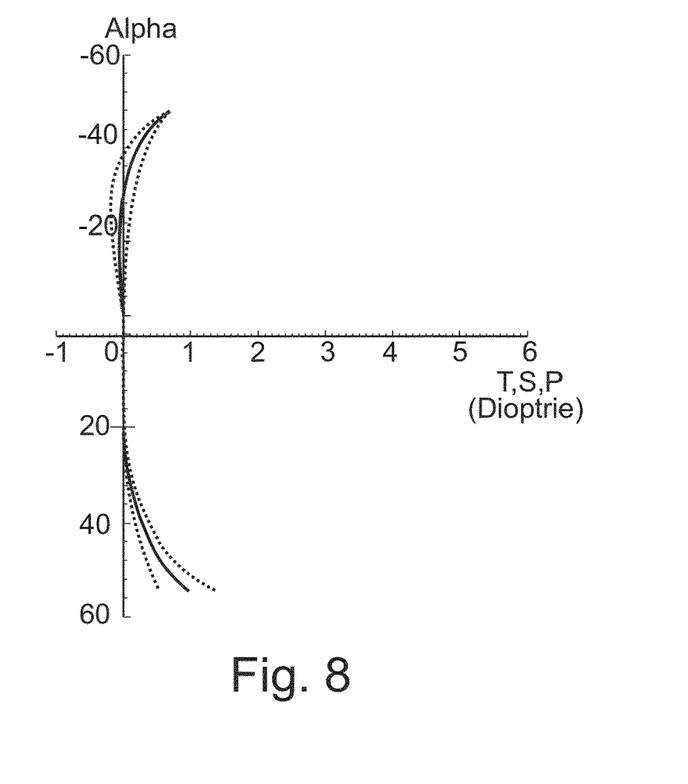
FIGS. 8 to 10 illustrate a single vision ophthalmic lens according to the invention.
Figure 9:
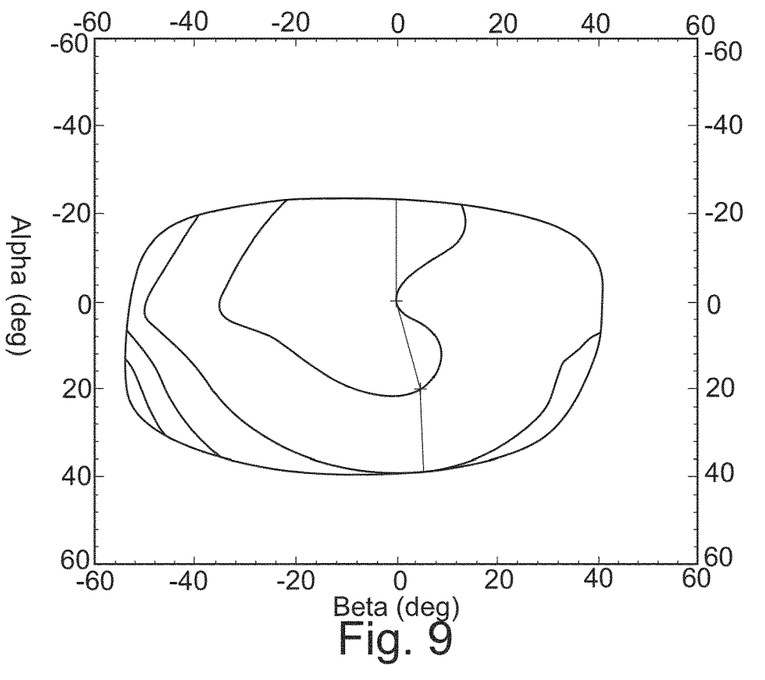
Figure 10:
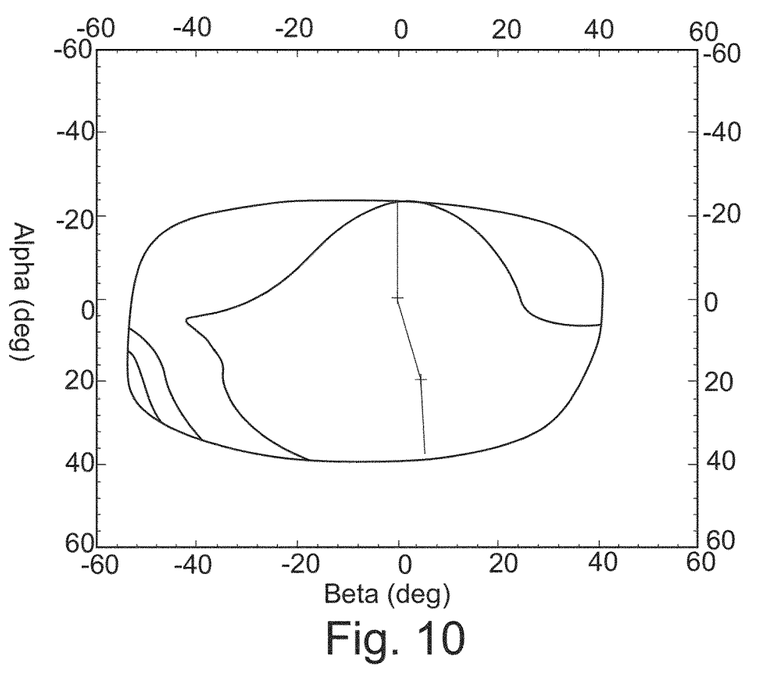

FIGS. 8 to 10 illustrate single vision ophthalmic lens determined using a method of the invention.

The single vision ophthalmic lens of the invention is determined for the same prescription as the prior art single vision ophthalmic lens.

The reference point on the single vision ophthalmic lens of the invention are:
- the fitting cross (α=0 deg., β=0 deg.) is located on the front surface of the single vision ophthalmic lens to align with the wearer eye;
- center point (α=0 deg., β=0 deg.) points where the prescription is to be found; and
- a low point corresponding approximately to a lowering gaze direction a equal to −20 deg. and a calculated inset value for a 0.4 m object distance.

The wearing parameters are the same as for the prior art single vision ophthalmic lens.

When determining the single vision ophthalmic lens of the invention the proximity table illustrated on FIG. 4 is used.

FIG. 8 illustrates the wearer mean power in diopters and resulting astigmatism in diopters along meridian line expressed in deg.

FIG. 9 represents the wearer mean power in diopters according to α, β gaze directions in deg.

FIG. 10 represents the resulting astigmatism in diopters according to α, β gaze directions in deg.

Table 3 provides optical values for a single vision ophthalmic lens of the invention when looking at near objects.

TABLE 3

| Name | β (deg) | α (deg) | Mean Power (D) | Astigmatism (D) |
|---|---|---|---|---|
| Center point | 0.0 | 0.0 | −4.00 | 0.00 |
| Low point | 4.8 | −19.8 | −4.00 | 0.02 |
| FC | 0.0 | 0.0 | −4.00 | 0.00 |

It appears that the wearer mean power error and the resulting astigmatism is reduced compared to prior art single vision ophthalmic lenses.

The invention has been described above with the aid of embodiments without limitation of the general inventive concept.

Many further modifications and variations will be apparent to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by computer for determining a single vision ophthalmic lens, the single vision ophthalmic lens being adapted to a wearer, the method comprising:
   a wearer prescription data providing step of providing wearer prescription data indicative at least of a prescribed optical power of the wearer;
   a wearing data providing step of providing wearing data indicative of a wearing parameters of the single vision ophthalmic lens by the wearer; and
   a single vision ophthalmic lens determining step of determining the single vision ophthalmic lens so that in wearing conditions corresponding to the wearing parameters, the single vision ophthalmic lens provides to the wearer the prescribed optical power in at least a first gazing direction when gazing at a first distance and a second gazing direction when gazing at a second distance,
   wherein the first and second distances are different and the first and second gazing directions are different, and
   wherein the single vision ophthalmic lens is configured so that for any gazing direction comprised in an elliptical cone of half major axis at 8 deg and half minor axis at 4 deg, an orientation of the major axis being horizontal in standard wearing conditions, the elliptical cone being centered at the second gazing direction, an optical power difference measured at said any gazing direction and an optical power prescription is smaller than or equal to 0.15 D.

2. The method according to claim 1, wherein the wearer prescription data is further indicative of a prescribed astigmatism of the wearer and during the single vision ophthalmic lens determining step the single vision ophthalmic lens is determined so that in wearing conditions corresponding to the wearing parameters, the single vision ophthalmic lens provides to the wearer the prescribed astigmatism in at least the first gazing direction when gazing at the first distance and the second gazing direction when gazing at the second distance.

3. The method according to claim 1, wherein the method further comprises, prior to the single vision ophthalmic lens determining step, an optical surface data providing step of providing optical surface data indicative of a finished surface of the single vision ophthalmic lens and during the single vision ophthalmic lens determining step the position and/or the shape of the surface opposite to the finished surface are/is determined.

4. The method according to claim 1, wherein the first distance corresponds to a far vision distance and the second distance corresponds to a near vision distance.

5. A device comprising:
  single vision ophthalmic lens adapted to a wearer having at least a prescribed optical power,
  wherein the single vision ophthalmic lens provides to the wearer in standard wearing condition in at least a first gazing direction the prescribed optical power when gazing at a first distance and in at least a second gazing direction the prescribed optical power when gazing at a second distance, the first and second distance being different and the first and second gazing direction being different,
  wherein the single vision ophthalmic lens is configured so that for any gazing direction comprised in an elliptical cone of half major axis at 8 deg and half minor axis at 4 deg, an orientation of the major axis being horizontal in standard wearing conditions, the elliptical cone being centered at the second gazing direction, an optical power difference measured at said any gazing direction and an optical power prescription is smaller than or equal to 0.15 D.

6. The device according to claim 5, wherein the angle between the first and the second gazing directions is greater than or equal to 5.0 deg.

7. The device according to claim 5, wherein the wearer has a prescribed astigmatism and the single vision ophthalmic lens provides to the wearer in standard wearing conditions in at least the first gazing direction the prescribed astigmatism when gazing at the first distance and in at least the second gazing direction the prescribed astigmatism when gazing at the second distance.

8. The device according to claim 7, wherein a norm of a vector corresponding to the difference of the prescribed astigmatism and the astigmatism in the first and second gazing direction is smaller than or equal to 0.05 D.

9. The device according to claim 7, wherein the single vision ophthalmic lens is configured so that for any gazing direction comprised in an elliptical cone of half major axis at 8 deg and half minor axis at 4 deg, the major axis being horizontal in standard wearing conditions, the elliptical cone being centered at the second gazing direction, an average norm of a vector corresponding to the difference of a measured astigmatism at said any gazing direction and the prescribed astigmatism is smaller than or equal to 0.05 D.

10. The device according to claim 5, wherein the angle between the first and the second gazing directions is greater than or equal to 5.0 deg, for example greater than or equal to 10.0 deg, for example greater than or equal to 15.0 deg, for example greater than or equal to 20.0 deg.

11. The device according to claim 5, wherein the first distance corresponds to a far vision distance.

12. The device according to claim 5, wherein the first gazing direction has an angle $\alpha$ greater than or equal to −16.0 deg and smaller than or equal to 8 deg and an angle $\beta$ greater than or equal to −5.0 deg and smaller than or equal to 5.0 deg.

13. The device according to claim 5, wherein the second gazing distance corresponds to a near vision distance.

14. The device according to claim 5, wherein the second gazing direction has an angle $\alpha$ greater than or equal to 5.0 deg and smaller than or equal to 36.0 deg and an angle $\beta$ greater than or equal to −4.0 deg and smaller than or equal to 16.0 deg.

* * * * *